United States Patent [19]

Tanaka et al.

[11] Patent Number: 5,782,032
[45] Date of Patent: Jul. 21, 1998

[54] COAL GASIFICATION FURNACE WITH A SLAG TAP HOLE OF SPECIFIC SHAPE

[75] Inventors: Sinji Tanaka, Juo-machi; Shuntaro Koyama; Atsushi Morihara, both of Hitachinaka; Takanori Kudo, Kodaira; Sadao Takahashi, Hitachi; Masato Iwahara, Hiroshima, all of Japan

[73] Assignees: Hitachi, Ltd.; Babcock-Hitachi Kabushiki Kaisha, both of Tokyo, Japan

[21] Appl. No.: 714,997

[22] Filed: Sep. 17, 1996

[30] Foreign Application Priority Data

Sep. 22, 1995 [JP] Japan .................................. 7-244104

[51] Int. Cl.$^6$ ................... C01J 3/52; C01J 3/48; C01J 3/84; F23J 9/00
[52] U.S. Cl. .................. 48/77; 48/DIG. 2; 110/229; 110/261; 110/263
[58] Field of Search .................. 110/263, 261, 110/264, 266, 341, 347, 165 R, 349, 166, 229; 431/173; 48/DIG. 2, 77, 101, 210; 222/575

[56] References Cited

U.S. PATENT DOCUMENTS

| | | | |
|---|---|---|---|
| 891,292 | 6/1908 | Rushmore | 110/165 R |
| 1,647,727 | 11/1927 | Daniels | 110/165 R |
| 1,747,676 | 2/1930 | Kerr | 110/165 R |
| 4,071,329 | 1/1978 | Eales | 48/62 R |
| 4,312,637 | 1/1982 | Loftus | 48/77 |
| 4,459,134 | 7/1984 | Gates, Jr. et al. | 48/77 |
| 4,574,002 | 3/1986 | Barot | 48/77 |
| 4,653,677 | 3/1987 | Peters et al. | 222/591 |
| 4,806,131 | 2/1989 | Morihara et al. | 48/210 |
| 5,331,906 | 7/1994 | Sonoda et al. | 110/264 |

FOREIGN PATENT DOCUMENTS

| | | | |
|---|---|---|---|
| 62-236891 | 10/1987 | Japan . | |
| 2-189388 | 7/1990 | Japan . | |
| 5-287283 | 11/1993 | Japan . | |
| 1 570 286 | 6/1980 | United Kingdom | 48/77 |

*Primary Examiner*—Ira S. Lazaras
*Assistant Examiner*—Ljiljana V. Ciric
*Attorney, Agent, or Firm*—Fay, Sharpe, Beall, Fagan, Minnich & McKee

[57] ABSTRACT

A coal gasification furnace includes a gasification chamber for producing therein a burnable gas from coal, a burner arranged on a side wall of the gasification chamber so as to inject coal and an oxidizing agent along a peripheral direction of the gasification chamber, a slag cooling chamber provided below the gasification chamber, and a slag tap partitioning the gasification chamber and the slag cooling chamber. The slag tap has a hole formed in a shape whereby the central portion of the hole is generally circular and oppositely directed slits extend outwardly from the central portion of the hole.

8 Claims, 11 Drawing Sheets

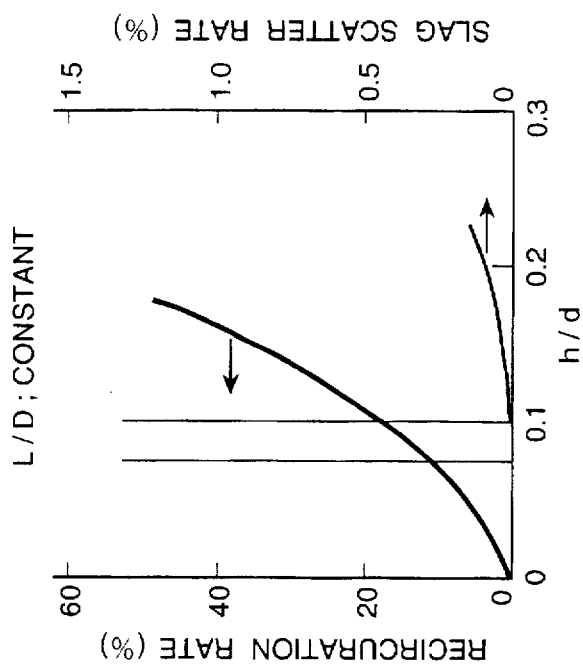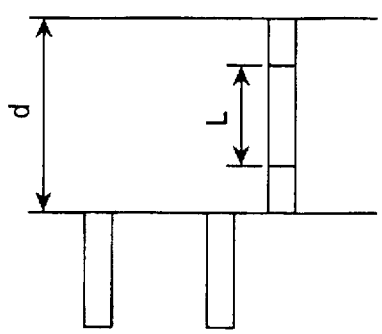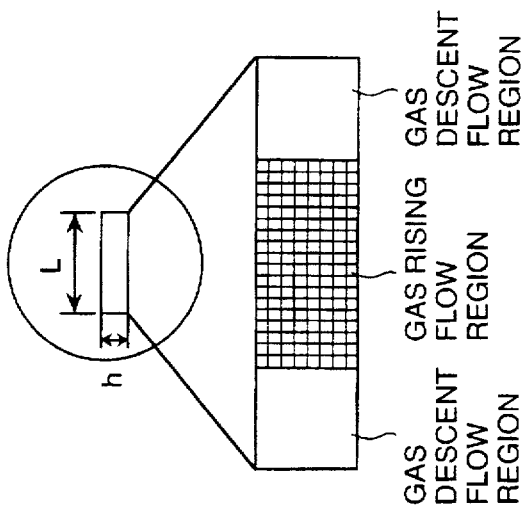

COAL GASIFICATION FURNACE WITH A SLAG TAP HOLE OF SPECIFIC SHAPE

BACKGROUND OF THE INVENTION

The present invention relates to a coal gasification furnace which produces burnable gas from coal and, more particularly, to a slag tap structure between a gasification chamber and a slag cooling chamber of the gasification furnace.

Since a method of gasifying coal by heating the coal to a temperature of more than the melting point of ash contained in the coal can produce hydrogen gas and carbon monoxide gas at a high efficiency, the method is widely used for production of compound gas and production of fuel gas. with respect to coal gasification furnaces for carrying out the coal gasification method, there is a jet layer coal gasification furnace which gasifies coal by swirling a jet flow of coal and an oxidizing agent.

A jet layer gasification furnace, in general, is provided, under a gasification chamber, with a slag cooling chamber for cooling slag melted in the gasification chamber which has a cylindrical or polygonal shape having an axis thereof in the perpendicular direction. Burners for jetting coal and an oxidizing agent are provided on a side wall of the gasification chamber. The burners are arranged in a tangential direction to an imaginal circle of the gasification chamber so that the coal and the oxidizing agent are jetted along an inner peripheral surface of the gasification chamber.

In the method of gasifying coal by the using a jet layer gasification furnace, usually molten slag descends along a furnace wall of the gasification furnace and drops on a surface of the slag tap, and then the molten slag descends into the slag cooling chamber through a slag tap hole formed in the slag tap portion. The slag cooling chamber is filled with water. The molten slag dropped into the slag cooling chamber is cooled by the water so as to be solidified. The molten slag, after being dropped from the slag tap hole but before it contacts the water, is apt to scatter, adhere to and be piled up on a wall of the slag cooling chamber. As the adhesion and piling up of slag on the wall of the slag cooling chamber progresses, the slag cooling chamber becomes choked with the slag adhered thereto. By the choking of the slag cooling chamber, molten slag becomes stored in the gasification chamber, and the molten slag is scattered by swirling flow of coal and oxidizing agent in the gasification chamber and becomes adhered to and piled up on a heat recovery portion of the gasification chamber, a flue at an outlet of the gasification furnace, etc. As a result, the gasification furnace is finally stops operating.

The adhesion and piling up of molten metal on the wall surface of the slag cooling chamber is influenced greatly by the structure of the slag tap. Many slag taps having slag tap holes which are circular in cross section have been used, as disclosed in JP A 62-236891. However, the slag tap hole of circular cross section cannot prevent molten slag from being adhered to the wall surface of the slag cooling chamber.

As additional prior art concerning a slag tap, there are JP A 5-287283 and JP A 2-189388. Each of these items of prior aims to prevent art solidification of molten slag at a slag tap hole, and does not take into consideration prevention of the adhesion and piling up of molten metal on a wall surface of a slag cooling chamber.

SUMMARY OF THE INVENTION

An object of the present invention is to suppress adhesion of molten slag on a wall surface of a slag cooling chamber in a jet layer coal gasification furnace.

A coal gasification furnace according to the present invention comprises a gasification chamber for producing therein burnable gas from coal, a burner arranged on a side wall of the gasification chamber so as to inject coal and an oxidizing agent along a peripheral direction of the gasification chamber, a slag cooling chamber provided below the gasification chamber, and a slag tap partitioning the gasification chamber and the slag cooling chamber. The furnace is characterized in that the slag tap has a hole formed in a non-circular cross sectional shape such that the cross sectional area of the hole is larger around a central portion of the hole than in a peripheral portion thereof and slits are formed in at least two opposite portions of the peripheral portion of the hole.

It is desirable to make the surface of the slag tap located in the gasification chamber flat, and not to provide a dam around the slag tap hole.

A slag tap which has a hole circular in cross section at its center and slits provided at opposite sides is most desirable. When a slit is formed at each side of the hole, the slits are preferable directly opposite one another.

The width and length of the slit are preferably at ratios of 0.07 to 0.10 and 0.29 to 0.43, to an inner diameter of the gasification chamber, respectively, and the ratio of the diameter of the circular portion to the length of the slit is preferably 0.4 to 0.7.

The shape of the slag tap hole may be rhombic.

The slag tap hole may be cross-shaped.

Further, the shape of the slag tap hole may be generally cross-shaped, of which a central portion of the hole is circular in cross section.

BRIEF DESCRIPTION OF THE DRAWINGS

FIGS. 12(a) to 12(d) are for explanation of a principle that rising flow takes place in a jet layer coal gasification furnace, wherein FIG. 12(a) is a graph showing a relation between V and r, 12(b) is a graph showing a relation between P and r, FIG. 12(c) is a schematic vertical view of part of the gasification furnace and FIG. 12(d) is a horizontal view of FIG. 12(c);

FIGS. 14(a) to 14(c) are for explanation, wherein FIG. 14(a) is a characteristic diagram showing an influence of a ratio h/d of width h of the slag tap hole as shown in FIGS.

Figure 15:
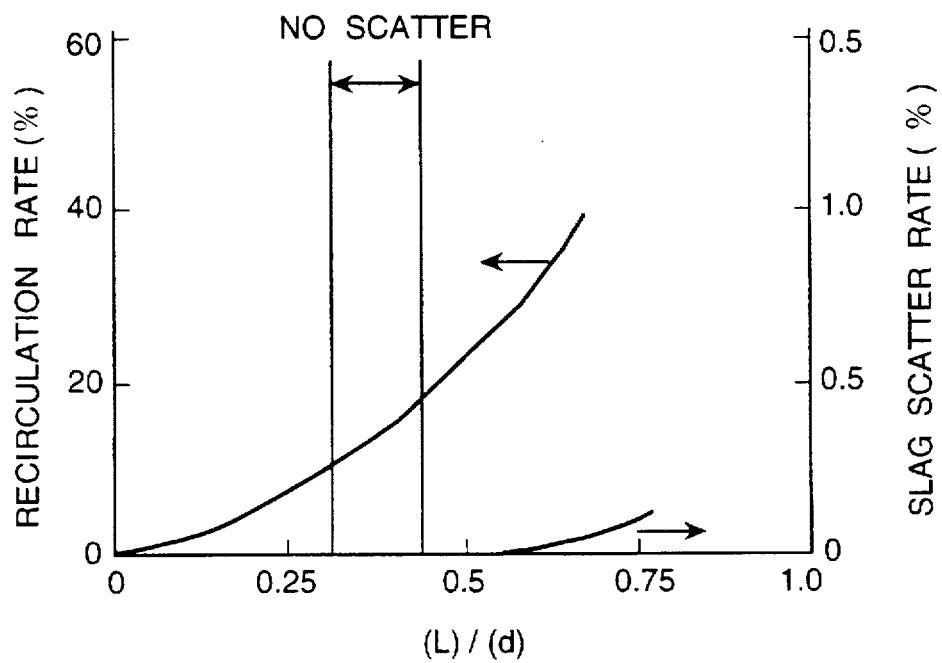
Figure 16A:
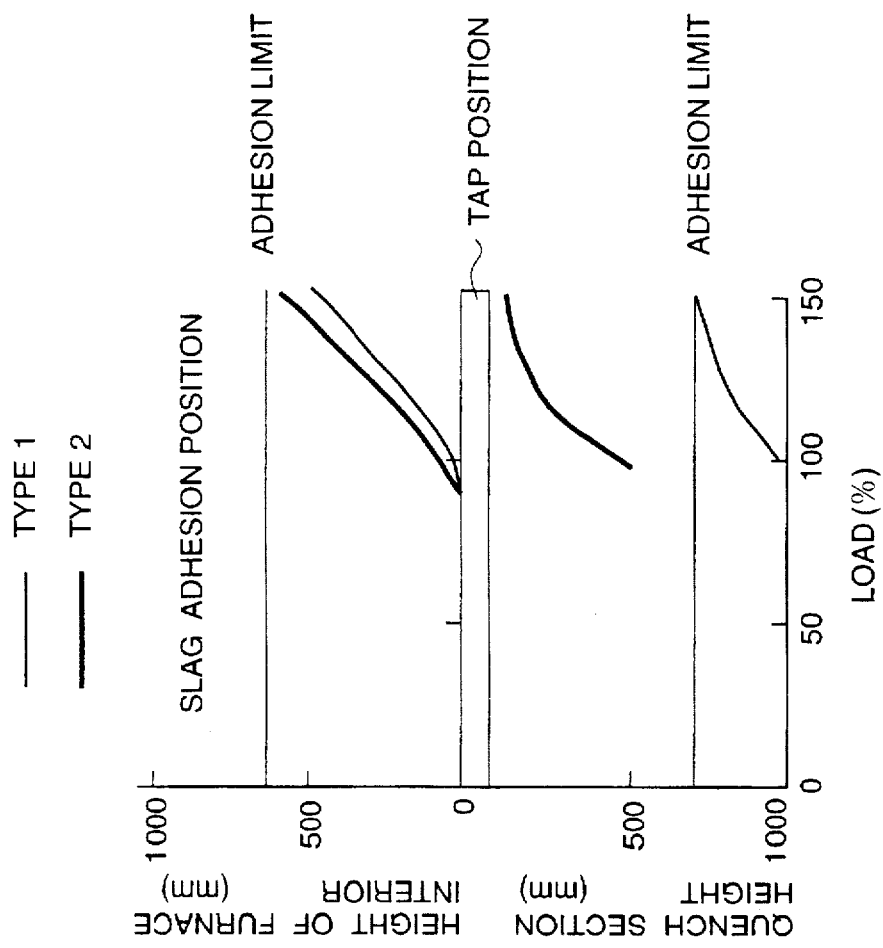
Figure 16B:
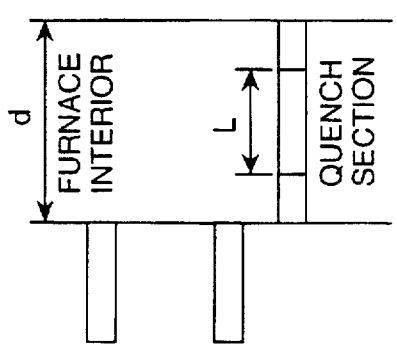
Figure 16C:
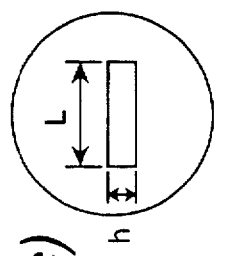
Figure 16D:
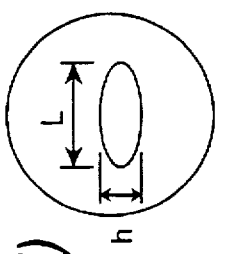
Figure 17A:
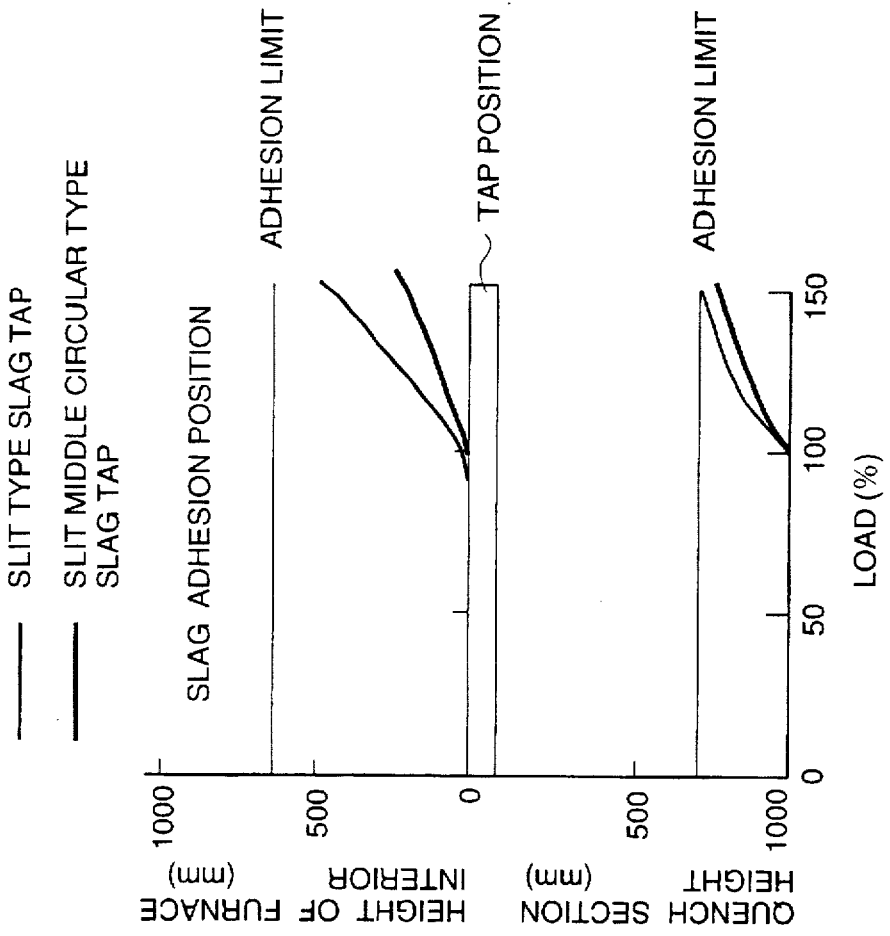
Figure 17B:
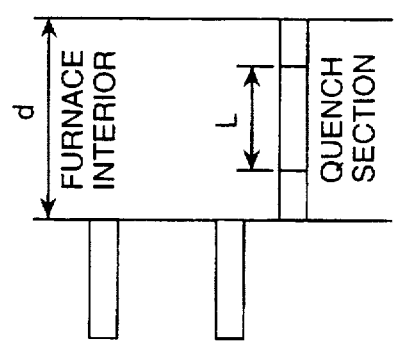
Figure 17C:
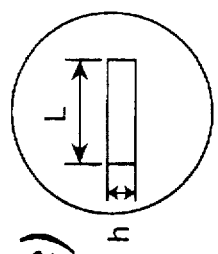
Figure 17D:
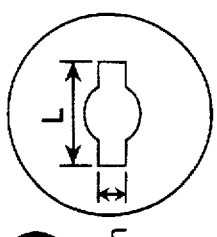

14(b) and 14(c) to an inner diameter d of a gasification furnace to slag scatter;

FIG. 15 is a characteristic diagram showing an influence of a ratio L/d of length L of the slag tap hole as shown in FIGS. 14(b) and 14(c) to the inner diameter d of the gasification furnace to slag scatter;

FIGS. 16(a) to 16(d) are for explanation, wherein FIG. 16(a) is a characteristic diagram showing scattering conditions in comparison with a slit type slag tap shown in FIG. 16(c) and an elliptical hole type slag tap shown in FIG. 16(d), each slag tap being applied in a gasification furnace shown in FIG. 16(b); and FIGS. 17(a) to 17(d) are for explanation, wherein FIG. 17(a) is a characteristic diagram showing scattering conditions in comparison with a slit type slag tap shown in FIG. 17(c) and a slit middle circular type slag tap shown in FIG. 17(d), each slag tap being applied in a gasification furnace shown in FIG. 17(b).

DESCRIPTION OF EMBODIMENTS OF THE INVENTION

In general, in a jet layer gasification furnace, coal and an oxidizing agent are sprayed into a gasification chamber which is cylindrical or polygonal with an axis in a vertical direction, to form a swirling flow around the axis. A strong swirling flow has a faster circumferential velocity than a velocity in a radial direction or an axial direction. Since in the swirling flow, centrifugal force is applied on the fluid and pressure balance, negative pressure is formed around a central portion of the gasification chamber, so that a large pressure difference occurs between the central portion and a wall of the gasification chamber.

Figure 12:
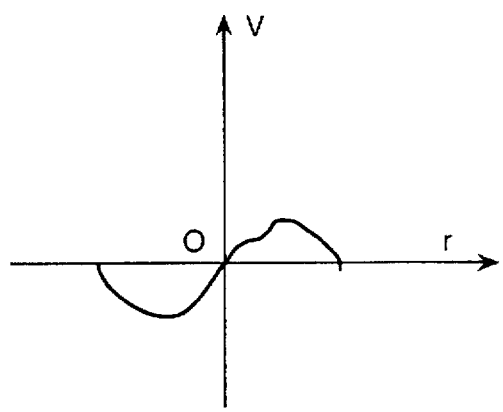
Figure 12:
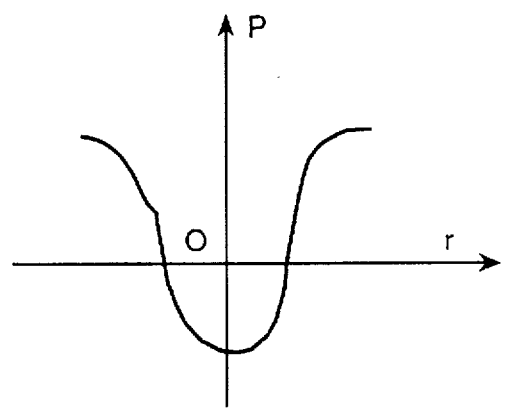
Figure 12:
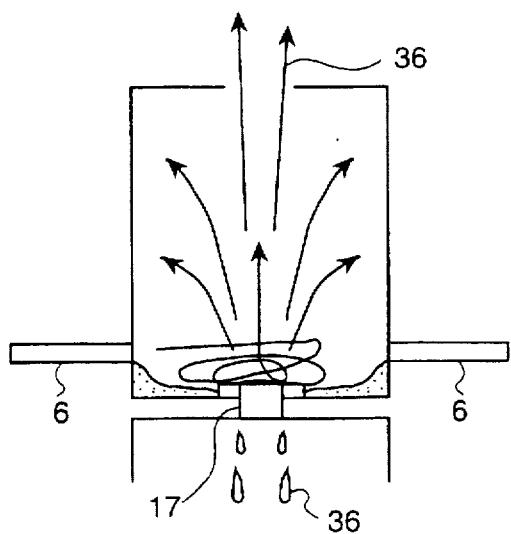
Figure 12:
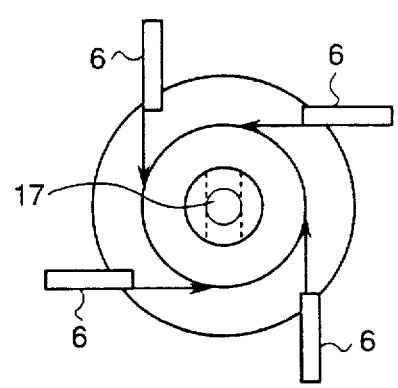

Therefore, the gas flow in the gasification chamber comprises a descending gas flow around the wall and a rising gas flow around the central portion. The principle is explained, referring to FIGS. 12(a) to 12(d). FIG. 12(a) shows distribution of peripheral velocity V to radial position r in the gasification chamber. FIG. 12(b) shows distribution of pressure P in the gasification chamber to radial position r. During the swirling flow, the distribution of peripheral velocity expresses a maximum value at a specific radial position as shown in FIG. 12(a). The distribution of peripheral velocity is a typical flow of general vortex, and synthesis of forced vortex and free vortex. Around the central portion of the swirling flow is a forced vortex region in which the velocity is proportional to radial position, and as radial diameter increases, the velocity also increases.

On the other hand, outside of the swirling flow is a free vortex region in which the velocity is proportional to the radial position, and as the radius increases the velocity decreases. Therefore, in the distribution, the velocity becomes maximum at a specific radial position. Further, as shown in FIG. 12(b), since it balances the centrifugal force caused by peripheral velocity, the pressure at outer side from the central portion becomes higher and the distribution has a convex shape in a lower direction around the central portion.

Therefore, in a jet layer gasification furnace which has a construction such that raw material feed burners 6 are arranged tangentially to the furnace wall surface in the gasification chamber to form a swirling flow, and a slag tap (which has a dam around a slag tap hole circular in cross section) is provided at the lower portion of the gasification chamber, as shown in FIGS. 12(c) and 12(d), slag on the slag tap is collected at the central portion by the swirling flow, and most of the slag flows down from a groove. However, a part of the slag which does not flow down, flows over the dam arranged around the slag tap hole 17, so that the slag is blown about by gas of the swirling flow flowing in a reverse or rising direction in the furnace and the slag is scattered by the rising flow. Further, in the case of a slag tap hole being circular in cross section, swirling flow in the gasification chamber reaches to the slag cooling chamber, and molten slag descended in the slag cooling chamber scatters to adhere to the wall surface of the slag cooling chamber.

In case of a slag tap having a slag tap hole which is circular in cross section with slits at at least two opposite portions of the hole, molten slag in the gasification chamber descends into the slag cooling chamber through the slit portions. The influence of a swirling flow in the gasification chamber is weakened under the slit portions, that is, in the slag cooling chamber, so that the molten slag having descended in the slag cooling chamber becomes more difficult to scatter and to adhere to the wall surface of the slag cooling chamber.

Embodiments of a coal gasification furnace according to the present invention will now be explained, referring to FIGS. 1–10 and FIG. 11.

In FIGS. 1–10, details of slag tap constructions relating to the present invention are explained.

Figure 1:
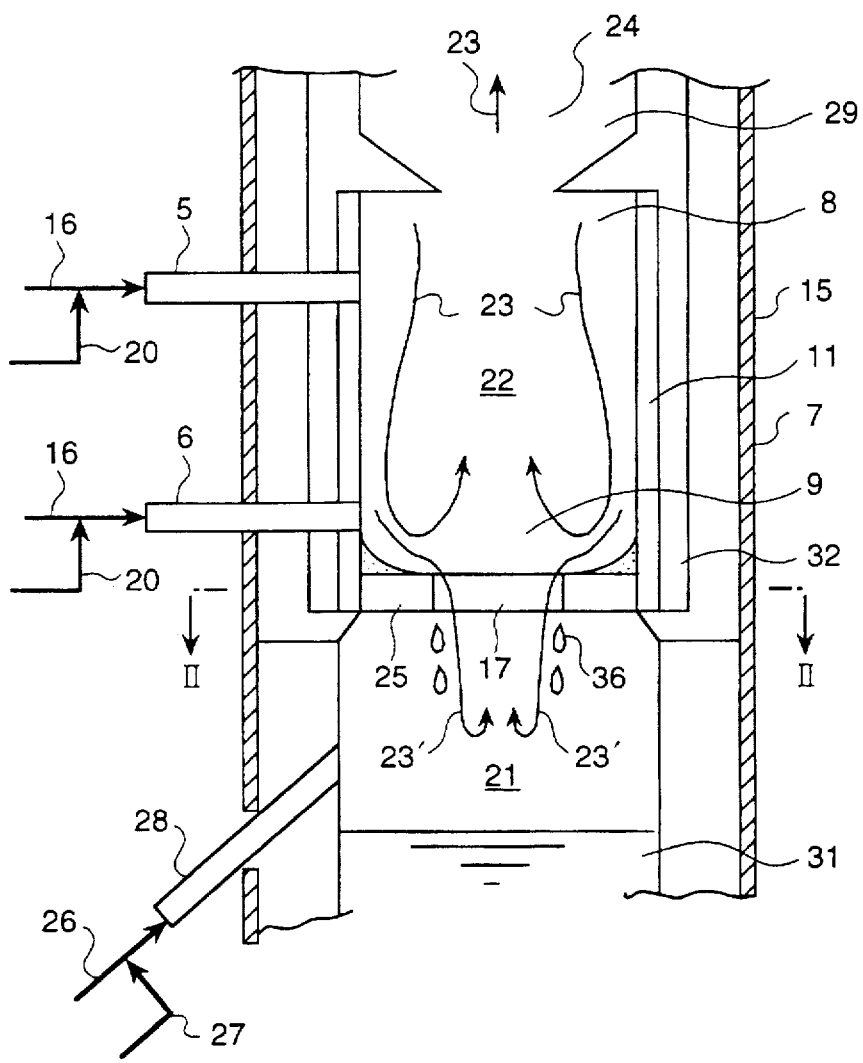
FIG. 1 is a sectional view of a coal gasification furnace to which the present invention is applied.
Figure 2:
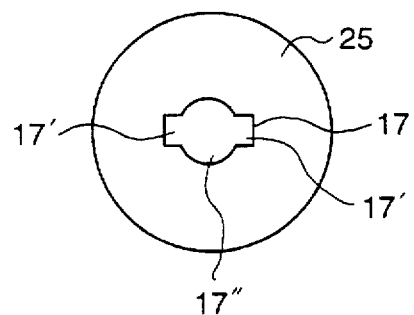
FIG. 2 is a view taken along a line II—II of FIG. 1.

FIGS. 1 and 2 show a detailed construction in which a slit middle circular type slag tap hole 17 is arranged in a central portion of a slag tap portion 25.

Pulverized coal is transferred by gas (nitrogen gas, air, carbon dioxide or production gas), and blown into a gasification chamber 7 through coal burners 5, 6. A gasifying or oxidizing agent 20 such as air and oxygen is fed through the coal burners 5, 6 in the same manner as coal and is mixed with the pulverized coal at tip portions of the coal burners 5, 6.

The gasification furnace has a water cooled wall structure 32 in which water is circulated in a gasification furnace pressure vessel 15, the out side of which is made of steel because temperature in the gasification furnace is raised to 1600° C. or more by the reaction of coal and the oxidizing agent. The water cooled wall 32 is lined with fire-resisting material 11 at its inside.

The gasification furnace 7 is constructed of a gasification chamber 22, a gasification chamber throttle portion 29, a wast heat recovery chamber 24, a slag tap portion 25, a slag cooling chamber 21, etc.

Coal reacts with an oxidizing agent 20 in the gasification chamber 22 to be turned into gas abundant in hydrogen and carbon monoxide.

Production gas 23 is introduced into a refining system such as the wast heat recovery chamber 24, a dust collector, etc. through the gasification chamber throttle portion 29 after leaving the gasification chamber 22.

On the other hand, slag melted in the gasification chamber 22 creeps or collects on the inner wall of the gasification chamber, drops into the slag cooling chamber 21 through wall side 17' of a slag tap hole 17 of a type having a generally circular center portion and opposed slits extending outwardly thereform, and then enters a slag recovery apparatus (not shown).

A part of production gas 23' introduced into the slag cooling chamber 21 is fed again to the inside of the gasification chamber 22 through a central portion 17" of slag tag hole 17.

In conventional slag tap constructions, most of the slag taps each are shaped circular, and dams for preventing slag from mixedly entering the slag cooling chamber are provided around the slag tap holes, or the dams are provided with groove formed therein for allowing slag to flow down at a fixed position. Therefore, the molten slag 36 rises up along the surface of the dam and the rising slag is blown about by a reverse rising gas caused by a swirling flow, and then the slag is scattered by the rising flow gas in a central portion of the gasification furnace.

Further, the slag is influenced by a swirling gas flow in the gasification chamber 21 and scattered so as to be adhered to and piled up on the inner wall of the slag cooling chamber.

Figure 13:
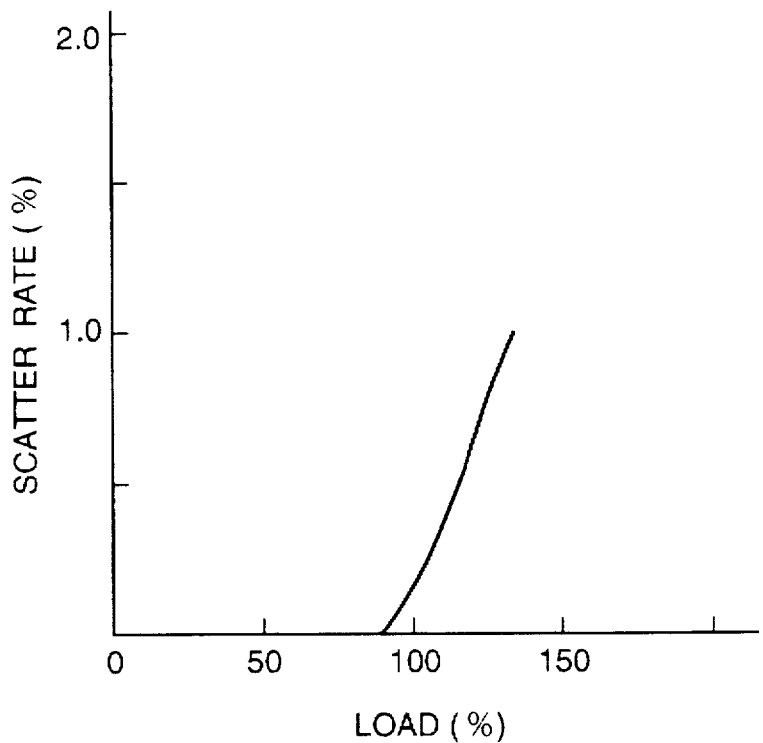
FIG. 13 is a graph showing a scattering condition in a gasification furnace by a conventional slag tap.

In order to examine the influence of the dam on slag scatter, a structure is made in which a slag tap hole 17 is formed at a central portion of the slag tap portion 25, and a dam is provided around the hole. By this construction, a scattering condition can be confirmed. The result is shown in FIG. 13. As is apparent from FIG. 13, slag scatter does not occur until load of about 80%. However, slag scatter increases greatly as the load increases from 90%. This occurs because swirling forces formed in the central portion of the furnace increase as the load increase and a part of the slag which has not flowed down from the slag tap hole is collected in the central portion while swirling, and that part of the slag collects on the wall surface of the dam around the slag tap hole. The molten slag 36 is blown about by the rising gas of the swirling gas flow, and then carried on the rising gas flow and caused to scatter.

Further, the velocity of the rising gas formed in the central portion in the furnace is increased according to an increase of the load, and the amount of scattered slag also is increased.

On the other hand, in a case wherein the dam around the slag tap hole is removed, since even if a swirling flow occurs in the gasification chamber 22 and has an influence on the surface of the slag tap, all the slag drops through the tap hole and follows a circulation gas(gas led from the gasification chamber 22 into the slag cooling chamber) flow flowing through the slag tap hole. All the slag therefore flows into the slag tap hole without being blown about by the rising gas flow even if the load increases. However, adhesion of slag on the wall of the slag cooling chamber 21 by scattering of the slag is still occurs.

Therefore, slag scatter in a jet layer gasification furnace in which raw material supply burners are arranged in the gasification reaction portion in a tangential direction and along the inner surface of the furnace to form a swirling flow is influenced strongly not only by a rising flow due to swirling flow generated in the central side, but by the slag tap structure.

Further, in the slag tap structure by which a recirculation line is formed in which gas returns again from the slag cooling chamber 21 to the gasification chamber 22, blowing about of the slag into the furnace and scatter of the slag in the cooling chamber occur according to the intensity of the recirculation gas flow. Therefore, it is important to select a slag tap structure and a recirculation gas velocity which does not cause the blowing about of the slag in the furnace and the scatter of the slag in the cooling chamber. Taking the above-mentioned matters into consideration, a means according to the present invention has been found that does not have any projection such as dam, is simple in construction, can lead a part of the produced burnable gas from the gasification chamber 22 to the slag cooling chamber, can cause recirculation flow to return again by one hole and heat the slag tap 25 by the recirculating burnable gas, and whereby slag scatter at the upper and lower sides of the slag tap can be suppressed.

An amount of recirculation gas Q increases according to an increase of the length L and width E of a slit on the circumference of a slag tap hole. As the amount of recirculation gas increases, the returning gas velocity of the recirculation gas flow in the slag tap hole becomes faster and scatter of slag occurs.

The influence of the shape of a slit type slag tap hole to slag scatter will now be examined. FIG. 14(a) shows a gas recirculation rate in a slag tap and a slag scatter rate to the lower side of a throttle portion when a ratio (h/d) of the slit width (h) influencing the slag scatter and the inner diameter (d) of the gasification chamber is changed under the condition of a ratio (L/d) between the length L of the slit type slag tap hole and the inner diameter of the gasification furnace being fixed. The gas recirculation rate and the slag scatter rate are defined by the following equations (1) and (2), respectively.

Gas recirculation rate=(a recirculation gas amount within the slag tap/a whole gas amount supplied in the gasification chamber)× 100(%)　　(1)

Slag scatter rate=(a slag recovery amount in a portion lower than the throttle portion/a slag supply amount)×100(%)　　(2)

As a result, in a range of h/d of 0.07–0.1, slag flows down stably without occurrence of slag scatter in the upper and lower regions of the slag tap. However, in the range of h/d of 0.1 or more, the recirculation gas amount increases and the recirculation gas velocity within the slag tap becomes faster, so that slag begins to scatter.

Further, the slag dropped in the slag cooling chamber 21 follows the recirculation gas flow, so that the slag scatters violently in the slag cooling chamber 21 and adheres to the inner wall of the slag cooling chamber 21. In case of h/d of 0.07 or less, since the recirculation gas amount decreases, no slag scatter occurs.

However, in order to exhaust slag without solidification thereof, it is necessary to maintain the slag tap portion at a temperature of a fluidizing point of ash +150° C., so that it is necessary for the recirculation gas amount to be 10% or more. Further, FIG. 15 shows a result of examination of a gas recirculation rate and a slag scatter rate when a ratio (L/d) of the slit length (L) influencing the slag scatter and the inner diameter (d) of the gasification chamber is changed under the condition of a ratio (h/d) between the width (h) of the slit type slag tap hole and the inner diameter (d) of the gasification furnace being fixed. In a range of L/d of 0.29 to 0.43, slag scatter did not occur. However, in a case of L/d being 0.43 or more, a recirculation gas amount increases and a returning gas velocity within the slag tap portion 25 becomes faster, so that slag began to scatter. At the same time, since the slag dropped in the slag cooling chamber 21 follows the recirculation gas flow, the slag violently scatters in the slag cooling chamber 21 and begins to adhere to the inner wall of the slag cooling chamber 21.

Further, calculating the velocity of returning gas, returning from the slag cooling chamber 21 to the gasification chamber 22, at which the slag begins to scatter, from the measurement results of FIGS. 14(a) and 15, the slag begins at 10 m/s, from which it is found to suppress the slag scatter by keeping the returning gas at a velocity of 10 m/s or less.

Next, as shown in FIGS. 16(a) to 16(d), slag scatter conditions in upper and lower regions of the slag tap are compared, using a slag tap with an elliptical slag tap hole and a slag tap with a slit type slag tap hole and setting the slit width h of the slag tap holes and an inner diameter d of a gasification chamber to a suitable value. As a result, the slag scatter in each case is within an adhesion limit range even if the load increases.

On the other hand, as for adhesion of slag to the wall of the slag cooling chamber, in a case where the slag tap with an elliptical slag tap hole is used, slag adhesion position is 500 mm at a load of 100% and the slag adhesion position approached to a lower side of the slag tap when the load increases to 150%. In the case of the slag tap with a slit type slag tap hole, the slag adhesion position is 1000 mm at a load of 100% and it approached the slag tap portion by about 300 mm when the load increased to 150%. This is because in case of the slag tap shape being circular or elliptical, a swirling gas flow generated in the gasification furnace influences the slag cooling chamber without attenuation above the slag tap surface. Therefore, as an element to decide a slag tap shape, evaluation which takes into consideration slag scatter to the gasification furnace side and the slag cooling chamber side is important.

Although even the slit type slag tap is applicable, as shown in FIG. 16(c), end portions of the hole are in gas descending regions in which slag drops, a central portion of the hole is in a gas rising region through which the recirculation gas returns into the gasification furnace. The slag scatters by this returning gas. As shown in FIG. 16, as the load increases, the recirculation gas also increases, so that the velocity of the returning gas becomes faster and the amount of slag scatter into the gasification furnace side increases. In order to further suppress slag scatter, since the gas rising region at this time was in a range of 0.4–0.7 to the slit length, the inventors considered that slag scatter into the gasification furnace could be suppressed further by the gas flow velocity at this region even if the load increases further, and a slit middle circular type slag tap is created on the basis of this conception.

This slit middle circular type slag tap is a construction in which a central portion of a slit is formed circular. The length and width of the slit circular type slag tap are basically the same as the above-mentioned size, and a radius of a circle in a middle portion of the slit is in a range of 0.4–0.7 times the slit length.

FIGS. 17(a) to 17(d) show slag scatter conditions by the slit middle circular type slag tap and the slit type slag tap. As is noted from FIG. 17(a), a slag scatter amount can be reduced to a half by the slit middle circular type slag tap. There is little difference in height of slag adhesion to the slag cooling chamber therebetween. The height of slag adhesion is within an allowable range in both of the slag taps.

Taking the above results into consideration, gasification experiment was conducted, using a gasification furnace having an inner diameter 300 mm of a gasification furnace reaction portion. The slit portion of the slit middle circular type slag tap was 30 mm in width and 120 mm in length and a circular portion in a middle of the slit portion was 70 mm in diameter. The hole having those dimensions is arranged in a central portion of the slag tap portion 25. Experimental conditions were as follows: experimental pressure was 3 atm, coal supply rate 40 kg/h, and oxygen supply rate 30 kg/h.

As a result, there was a little influence to molten slag over the slag tap surface, there was no scatter of molten slag 36 to the throttle portion 29 of the upper portion of the gasification chamber and to the upper portion of the gasification chamber 22.

Embodiments shown in FIGS. 3–10 each have an equivalent effect to the embodiment shown in FIG. 1.

Figure 3:
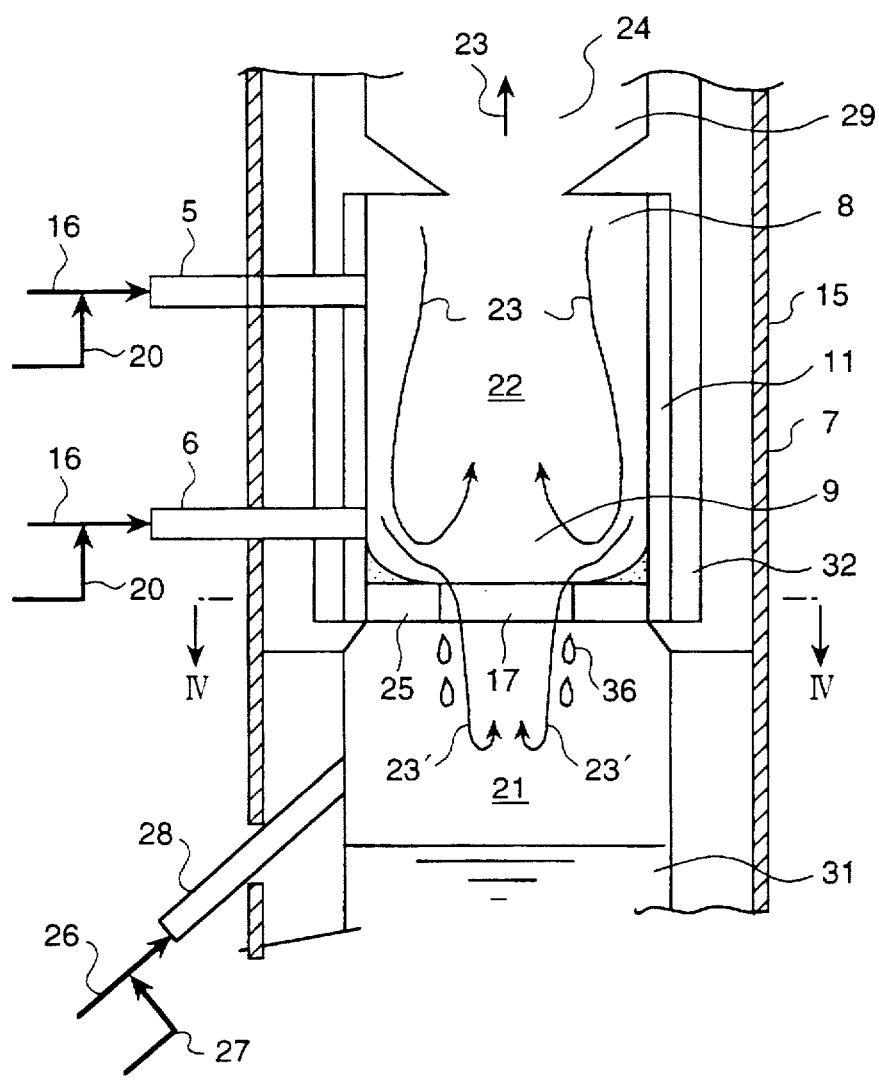
FIG. 3 is a sectional view of another coal gasification furnace to which the present invention is applied.
Figure 4:
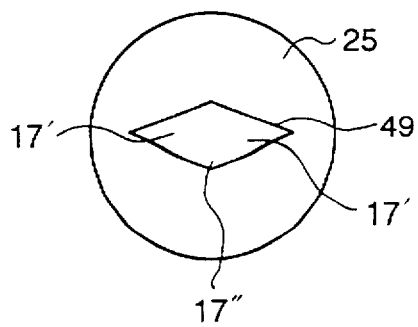
FIG. 4 is a view taken along a line IV—IV of FIG. 3.

FIGS. 3, 4 show an embodiment of a coal gasification furnace in which a rhombic slag tap hole 17 is formed in a central portion of the slag tap portion 25. Slag melted in the gasification chamber 22 collects the inner wall of the gasification furnace, passes down a wall side 17' of the rhombic slag tap hole 17, drops into the slag cooling chamber 21 and then enters a slag recovery apparatus.

A part of production gas 23' led into the slag cooling chamber 21 is supplied again into the gasification chamber 22 through the central portion 17' of the slit type slag tap hole 17. The sizes of the rhombic hole are basically in a range of the sizes attained in the slit type slag tap. The embodiment also has an equivalent effect to the embodiment of FIGS. 1, 2.

Figure 5:
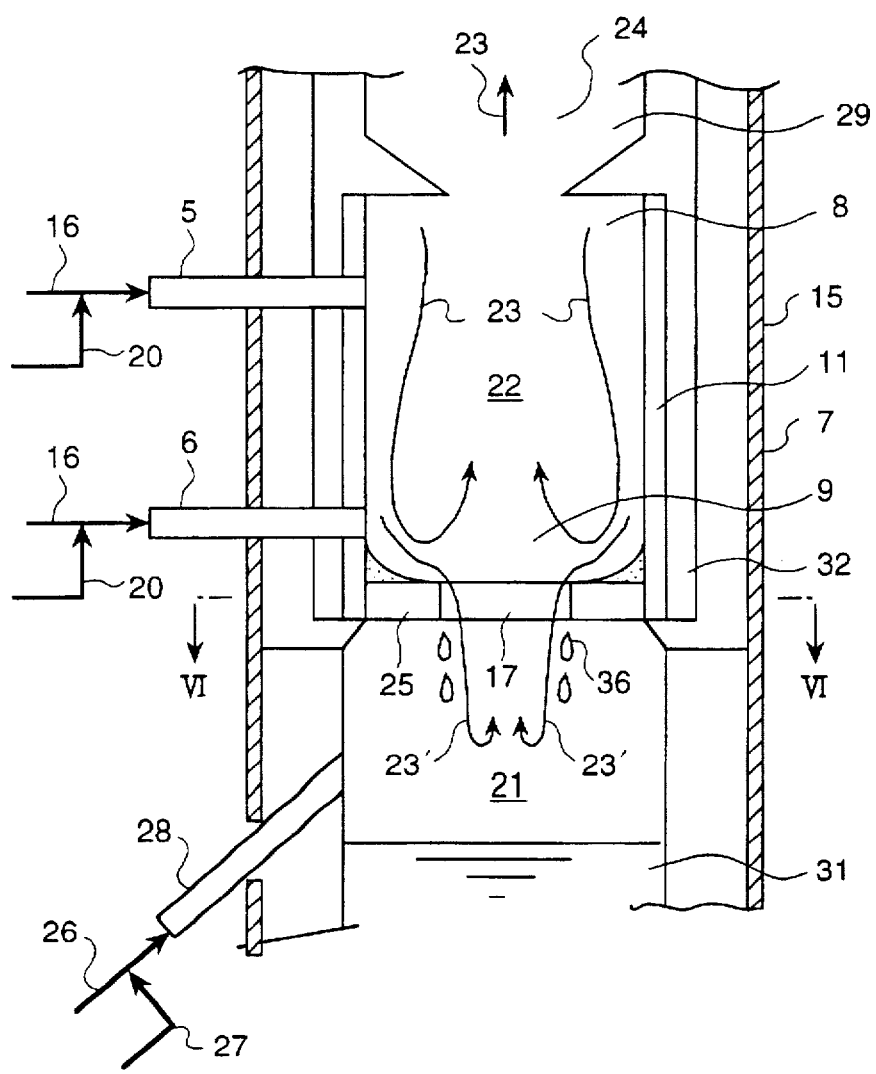
FIG. 5 is a sectional view of another coal gasification furnace to which the present invention is applied.
Figure 6:
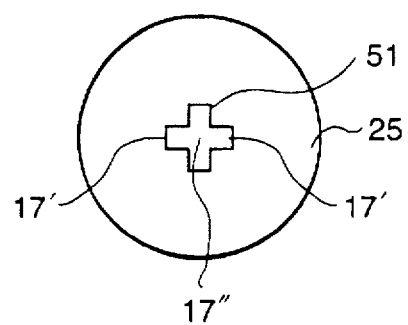
FIG. 6 is a view taken along another line VI—VI of FIG. 5.

FIGS. 5, 6 show an embodiment of a coal gasification furnace in which a cross-shaped slag tap hole 17 is formed in a central portion of the slag tap portion 25. Slag melted in the gasification chamber 22 collects on the inner wall of the gasification furnace, passes down a wall side 17' of the cross-shaped slag tap hole 17, drops into the slag cooling chamber 21 and then enters a slag recovery apparatus(not shown).

A part of the production gas 23' led into the slag cooling chamber 21 is supplied again into the gasification chamber 22 through the central portion 17' of the cross-shaped slag tap hole 17. The sizes of the cross-shaped slag tap hole are basically in a range of sizes attained in the slit type slag tap. The cross-shaped grooves or slots of the cross-shaped slag tap hole are same size as each other. The embodiment also has an equivalent effect to the embodiment of FIGS. 1, 2.

Figure 7:
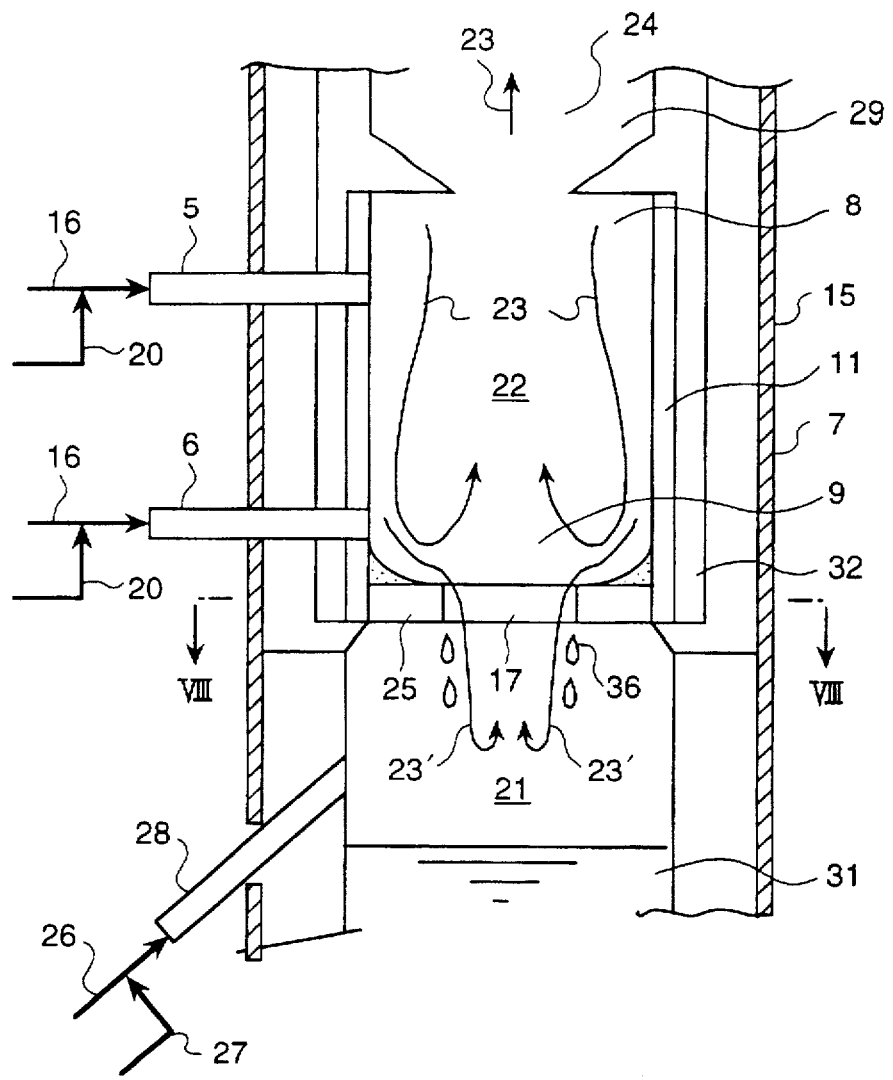
FIG. 7 is a sectional view of another coal gasification furnace to which the present invention is applied.
Figure 8:
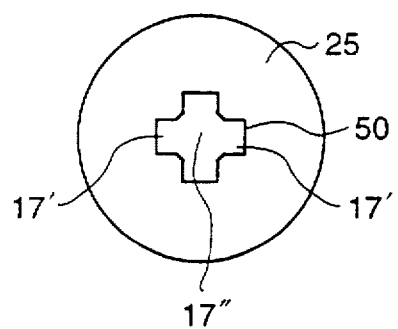
FIG. 8 is a view taken along a line VIII—VIII of FIG. 7.

FIGS. 7, 8 show an embodiment of a coal gasification furnace in which a cross middle circular type slag tap hole 17 is formed in a central portion of the slag tap portion 25. In this slag tap hole, a central portion of the cross-shaped hole is formed generally circular. With the cross middle circular type slag tap, slag melted in the gasification chamber 22 collects on the inner wall of the gasification furnace, passes down a wall side 17' of the cross middle circular type slag tap hole 17, drops into the slag cooling chamber 21 and then enters a slag recovery apparatus(not shown).

A part of the production gas 23' led into the slag cooling chamber 21 is supplied again into the gasification chamber 22 through the central portion (middle circular portion) 17' of the cross middle circular type slag tap hole 17.

The sizes of cross middle circular portion of the cross middle circular type slag tap hole 17 are basically in a range of sizes attained in the slit type slag tap, and cross-shaped grooves of the hole are the same size as each other.

Further, the radius of the central circular portion of the cross middle circular type slag tap hole 17 is 0.4 to 0.7 times the length of the slit. The embodiment also has an equivalent effect to the embodiment of FIGS. 1, 2.

Figure 9:
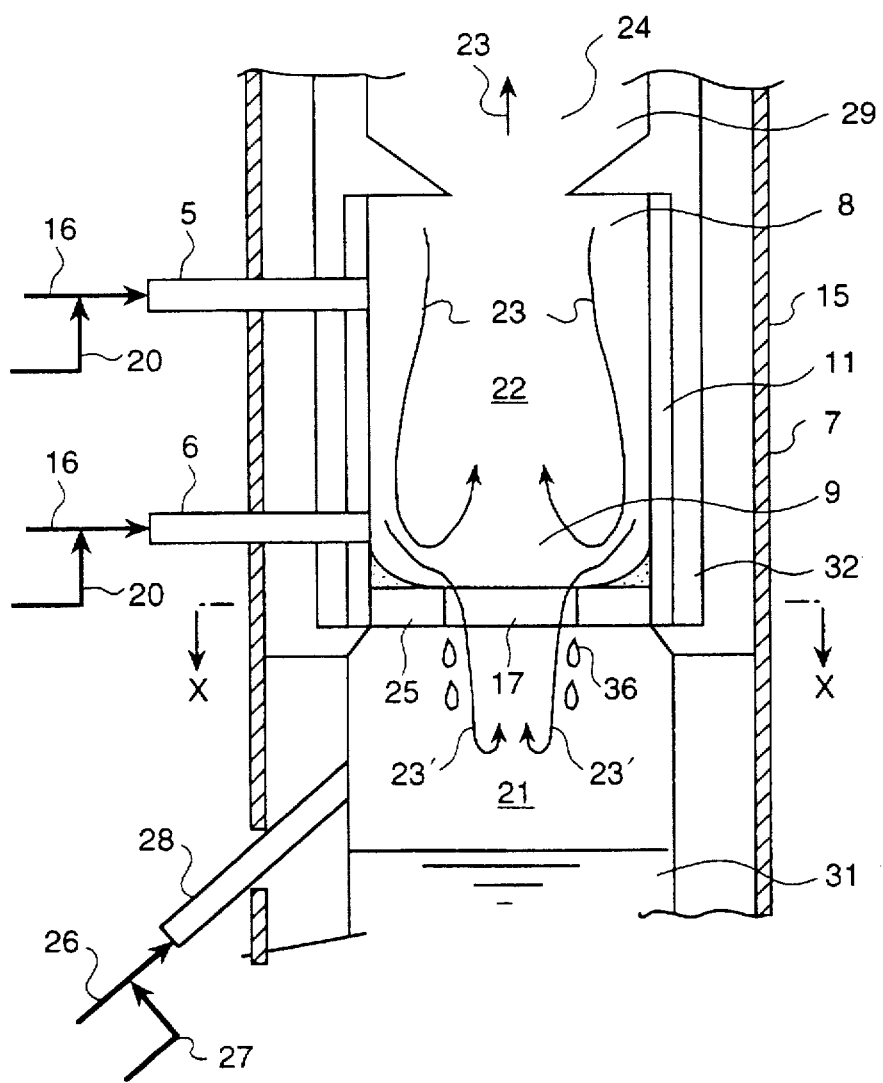
FIG. 9 is a sectional view of another coal gasification furnace to which the present invention is applied.
Figure 10:
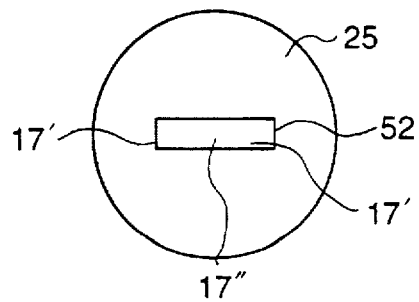
FIG. 10 is a view taken along a line X—X of FIG. 9.

FIGS. 9, 10 show an embodiment of a coal gasification furnace in which a slit type slag tap hole 17 is formed in a central portion of the slag tap portion 25. Slag melted in the gasification chamber 22 collects on the inner wall of the gasification furnace, passes down a wall side 17' of the slit type slag tap hole 17, drops into the slag cooling chamber 21 and then enters a slag recovery apparatus(not shown).

A part of the production gas 23' led into the slag cooling chamber 21 is supplied again into the gasification chamber 22 through the central portion 17" of the slit type slag tap hole 17. The embodiment also has an equivalent effect to the embodiment of FIGS. 1, 2.

Figure 11:
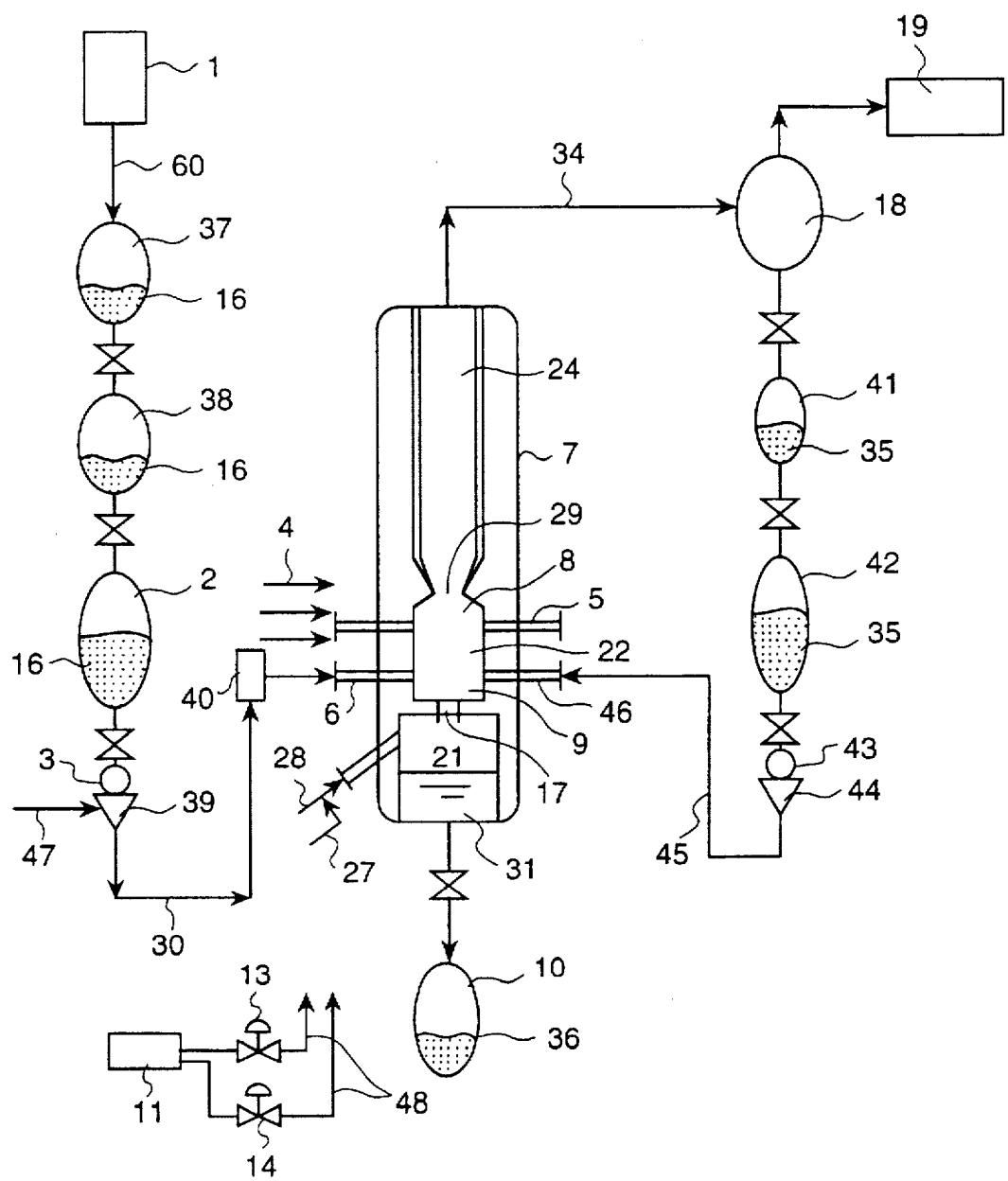
FIG. 11 is a schematic diagram of a gasification system to which the present invention is applied.

FIG. 11 shows a schematic structure of a gasification system to which the present invention is applied. The whole construction of the gasification system comprises a coal supply system, oxidizing agent supply system, a gasification furnace, and a refining apparatus.

In FIG. 11, the coal supply system comprises a puluverizer 1, a pulverized coal transfer line 60, a coal normal pressure hopper 37, a coal normal pressure-pressurized hopper 38, a coal supply hopper 2, a coal supply apparatus (feeder,etc.) 3, a mixer 39, a pneumatic coal transfer line 30, a distributor 40 and branch pipes 4.

Pulverized coal 16 pulverized by the pulverizer 1 is fed into the coal normal pressure hopper 37 and then into coal normal-pressurized pressure hopper 38 through the pulverized coal transfer line 60, and then transferred to the coal supply hopper 2. The pulverized coal 16 in the coal supply hopper 2, of which a supply rate is set by the coal supply apparatus 3, is freely dropped into the mixer 39 in which the pulverized coal is mixed with inert gas 47 such as nitrogen gas or carbon dioxide. The pulverized coal mixed with inert gas is transferred to the distributor 40 by pneumatic transfer through the pneumatic transfer line 30, distributed uniformly into several lines by the distributor 40, and then supplied into the gasification chamber by coal burners 5, 6 arranged in the gasification furnace 7 through the branched pipes 4.

The oxidizing agent(air or oxygen)supply system comprises an oxidizing agent compressor 11, oxidizing agent flow control valves 13, 14, and an oxidizing agent supply line 48. The gas from the oxidizing agent compressor 11 passes the upstream and downstream oxidizing agent flow control valves 13, 14, and is supplied to the coal burners 5, 6 arranged in the gasification furnace 7 through the oxidizing agent supply line 48. The oxidizing agent contacts with pulverized coal 16 at the outlets at the tips of the burners 5, 6 to gasify the pulverized coal.

The gasification furnace 7 comprises a gasification chamber 22, a slag cooling chamber 21, a throttle portion 29 at the upper portion of the gasification furnace and a waste heat recovery apparatus 24.

The gasification chamber 22 has upper and lower reaction zones 8, 9. In the upper reaction zone 8, a relatively small amount of oxygen is supplied for the pulverized coal to produce active char. The lower reaction zone 9 is kept at least at the temperature of the melting point of ash in the coal. The coal burners 5, 6 are arranged on the upper and lower reaction zones 8, 9 of the gasification furnace 7. In the upper reaction zone 8, the active char is carried by a swirling descending flow and supplied to the lower high temperature zone in which the active char reacts with carbon dioxide and water vapor to become slag that ash is melted. The slag 36 freely drops into the slag cooling chamber 21 filled with cooling water 31, where it is rapidly cooled (quenched) and then recovered by the slag recovery apparatus 10.

Further, in this gasification furnace, the slit middle circular slag tap 17 according to the present invention is arranged at the bottom of the gasification chamber 22 of lower portion of the gasification furnace 7, and is made so that the slag 36 drops from a wall side of the slit middle circular type slag tap hole 17.

Further, a part of the production gas led to the slag cooling chamber 21 together with the slag 36 is supplied again into the gasification chamber 22 from the central portion of the slit middle circular type slag tap hole 17.

The gas produced in the gasification furnace 7 is led, through a production gas line 34, to a cyclone 18 and the refining apparatus 19 in which dust, char, hydrogen sulfite, etc. in the production gas are removed, whereby the production gas is used for fuel or raw material.

The dust recovery system comprises the cyclone 18, a char middle hopper 41, a char supply hopper 42, a feeder 43, a mixer 44, a char transfer line 45 and a char burner 46.

Char 35 recovered by the cyclone 18 is fed to the char middle hopper 41, and then transferred into the char supply hopper 42. After that, a supply amount of the char is set by the feeder 43, then the char 35 is freely dropped into the mixer 44 in which the char is mixed with inert gas 47 such as nitrogen gas, carbon dioxide, etc. After that, the char is transferred by pneumatic transfer into the gasification furnace through a char transfer line 45 and the char burner 46.

The above is an aspect of the use of the present invention whereby it is applied to a one chamber, two stage reaction type jet layer gasification system. However, the present invention can be applied to any type of gasification system or apparatus or power plant if the gasification furnace is of the jet layer type, without limiting the invention to the one chamber, two stage reaction type jet layer gasification system.

As explained above, according to the present invention, the slag tap construction whereby molten slag is collected in the lower portion of the reaction zone of the gasification furnace and discharged stably is accomplished through the use of the slit middle circular type tap without a dam. Moreover, the slit middle circular type slag tap hole is arranged in the central portion of the slag tap portion of the lower portion of the gasification furnace, whereby slag scatter can be prevented and the slag on the surface of the slag tap can be caused to stably flow down into the slag cooling chamber.

Since the lower portion of the gasification furnace is at a high temperature of 1600° C. or more, ash in the coal is melted to be slag. As a method of stably recovering the slag without scatter to the upper portion, one slit middle circular type slag tap hole is formed in the central portion of the slag tap portion at the lower portion of the gasification furnace. A recirculation effect is caused wherein, with this slag tap hole, a part of the production gas in the gasification chamber is led from the gasification chamber to the slag cooling chamber and returns again to the gasification chamber. By heating the slag tap by the recirculating burnable gas, the slag on the surface of the slag tap can be stably flowed downwardly.

Further, by making the surface the same as the bottom surface of the slag tap without providing any dam around the outlet of the slag tap hole, even if swirling flow occurring in the gasification furnace influences on the surface of the slag tap, the slag is not carried by the rising flow and all the produced slag is stably flowed down into the slag hopper, whereby slag scatter can be suppressed.

What is claimed is:

1. A coal gasification furnace having a gasification chamber for producing therein burnable gas from coal, a burner arranged on a side wall of said gasification chamber so as to inject coal and an oxidizing agent along a peripheral direction of said gasification chamber, a slag cooling chamber provided below said gasification chamber, and a slag tap partitioning said gasification chamber and said slag cooling chamber, characterized in that said slag tap has a hole formed in such a shape in a cross-section perpendicular to the axis of said hole that the cross-sectional area of said hole is larger around a central portion of said hole than in a peripheral portion thereof, said peripheral portion being formed in a slit-like shape in a cross-section perpendicular to the axis of said hole, and extending outwardly from said central portion in at least two opposite directions.

2. A coal gasification furnace according to claim 1, characterized in that said slag tap hole, in a cross-section perpendicular to the axis of said hole, has a circular central portion and at least two opposite portions which are a slit-like in shape extending outwardly from said central portion.

3. A coal gasification furnace according to claim 1, characterized in that an upper surface of said slag tap positioned in said gasification chamber is flat.

4. A coal gasification furnace according to claim 2, characterized in that said slag tap hole has a width and a length of which ratios to an inner diameter of said gasification chamber are 0.07 to 0.10 and 0.29 to 0.43, respectively, and a ratio of the diameter of said circular central portion to the length of said slag tap hole is 0.4 to 0.7.

5. A coal gasification furnace according to claim 1, characterized in that the shape of said slag tap hole in a cross-section perpendicular to the axis of said hole is rhombic.

6. A coal gasification furnace according to claim 1, characterized in that said slag tap hole is cross-shaped.

7. A coal gasification furnace according to claim 1, characterized in that the shape of said slag tap hole in a cross-section perpendicular to the axis of said hole is cross-shaped and has a central portion which is circular.

8. A coal gasification furnace having a gasification chamber for producing therein burnable gas from coal, a plurality of burners arranged so as to inject coal and an oxidizing agent into said gasification chamber along a peripheral direction of said gasification chamber to form swirling flowws, a slapg cooling chamber provided below said gasification chamber, and a slag tap partitioning said gasification chamber and said slag cooling chamber, characterized in that said slag tap has a hole region formed at a central portion thereof for communicating between said gasification chamber and said slag cooling chamber, said hole region formed of a central hole region and at least two slit-like hole regions each fluidly communicating with said central hole region and extending horizontally outwardly from said central hole region in opposite directions, the horizontal cross-sectional area of said central hole region being larger than the horizontal cross-sectional area of said at least two slit-shaped hole regions.

* * * * *